United States Patent
Manning et al.

(10) Patent No.: US 12,380,090 B2
(45) Date of Patent: Aug. 5, 2025

(54) MANAGING DATA RISK USING AUTOMATED DEPENDENCY DISCOVERY

(71) Applicant: GOOGLE LLC, Mountain View, CA (US)

(72) Inventors: Gavin Manning, Mountain View, CA (US); Paul Vanlint, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/605,313

(22) Filed: Mar. 14, 2024

(65) Prior Publication Data

US 2024/0311366 A1     Sep. 19, 2024

Related U.S. Application Data

(60) Provisional application No. 63/452,161, filed on Mar. 14, 2023.

(51) Int. Cl.
*G06F 7/00* (2006.01)
*G06F 16/23* (2019.01)

(52) U.S. Cl.
CPC ............... *G06F 16/2365* (2019.01)

(58) Field of Classification Search
CPC ............ G06F 16/2365; G06F 16/1748; G06V 40/161; H04L 67/1097
USPC .................................................. 707/600–899
See application file for complete search history.

(56) References Cited

U.S. PATENT DOCUMENTS

2016/0378577 A1* 12/2016 Russell ............... G06F 16/21
719/318

FOREIGN PATENT DOCUMENTS

WO    WO-2020/264319 A1    12/2020

OTHER PUBLICATIONS

Wang et al., "Groot: An Event-graph-based Approach for Root Cause Analysis in Industrial Settings", retrieved from the internet on Mar. 14, 2024, https://arxiv.org/pdf/2018.00344.pdf, 11 pages.
Liu et al., "MicroHECL: High-Efficient Root Cause Localization in Large-Scale Microservice Systems", retrieved from the internet on Mar. 14, 2024, https://arxiv.org/pdf/2103.01782.pdf, 10 pages.
Stergiopoulos et al., "A Process-based Dependency Risk Analysis Methodology for Critical Infrastructures", Int. J. Critical Infrastructures, vol. 13, Nos. 2/3, 2017, 23 pages.

* cited by examiner

*Primary Examiner* — Isaac M Woo
(74) *Attorney, Agent, or Firm* — MARSHALL, GERSTEIN & BORUN LLP

(57) ABSTRACT

To assess risk for a target dataset including a plurality of records, a system receives, from a data source, information related to a plurality of datasets including the target dataset; automatically determines dependencies on the target dataset using logs indicative of read and write operations related to the target dataset; generates, using the determined dependencies, a dependency graph indicative of dependencies, within the plurality of datasets, on the target dataset; determines, using the generated dependency graph, a level of risk associated with the target dataset; and provides an indication of the determined level of risk.

20 Claims, 3 Drawing Sheets

MANAGING DATA RISK USING AUTOMATED DEPENDENCY DISCOVERY

FIELD OF THE DISCLOSURE

This disclosure relates to techniques for measuring risk associated with managing datasets, particularly to automatically discovering dependencies between datasets as a part of automatic risk assessment.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some systems operate on large datasets with complex dataflows associated with circular dependencies, partial dependencies (e.g., where operations on a certain dataset require a part of a dataset from another system), multiple dependencies (e.g., where operations on a certain dataset require datasets from multiple systems), etc. These dependencies create complex, difficult-to-analyze data flows.

Further, different types of data on which systems operate can make analysis even more difficult. For example, systems may use data entered by users as ground-truth datasets in machine learning operations, and use other datasets for transformation (e.g., to transcode videos to multiple resolutions for efficient display on different devices). Some of the datasets also can be sensitive, e.g., a system may not use certain data outside of a certain logical domain or outside a certain geographic area.

Protecting such systems from data corruption is difficult because of the complex data flows and different types of data. Corruption may occur, for example, due to human error (e.g., deployment of software that contains errors), hardware failure, random bit flips, etc. In large systems, it may be infeasible to allocate limited back-up resources to protect against data corruption in all instances (e.g., by providing redundancies for all such data). There is therefore a need for techniques that can identify areas in which to allocate resources to ensure the greatest increase in overall reliability. However, it can be difficult to identify such areas, and gaining knowledge of upstream and downstream dependencies is not a trivial endeavor. For example, requiring that software developers declare their data sources requires significant manual effort and is unlikely to scale well, or to be complete/accurate.

SUMMARY

A system of this disclosure automatically prioritizes the checking of data flows and interactions between data sets. Using this output, the system can allocate storage resources more efficiently and schedule new or additional backup processes, react to data corruption more effectively, and/or better ensure that sensitive data is not being copied or used inappropriately, for example.

An example implementation of these techniques is a method of risk assessment for a target dataset including multiple records. The method may include receiving, by one or more processors and from a data source, information related to a plurality of datasets including the target dataset, and automatically determining, by the one or more processors, dependencies on the target dataset using logs indicative of read and write operations related to the target dataset. The method may also include generating, by the one or more processors and using the determined dependencies, a dependency graph indicative of dependencies, within the plurality of datasets, on the target dataset, and determining, by the one or more processors and using the generated dependency graph, a level of risk associated with the target dataset. The method may also include providing, by the one or more processors, an indication of the determined level of risk (e.g., in a display or user interface).

DETAILED DESCRIPTION OF THE DRAWINGS

Figure 1:
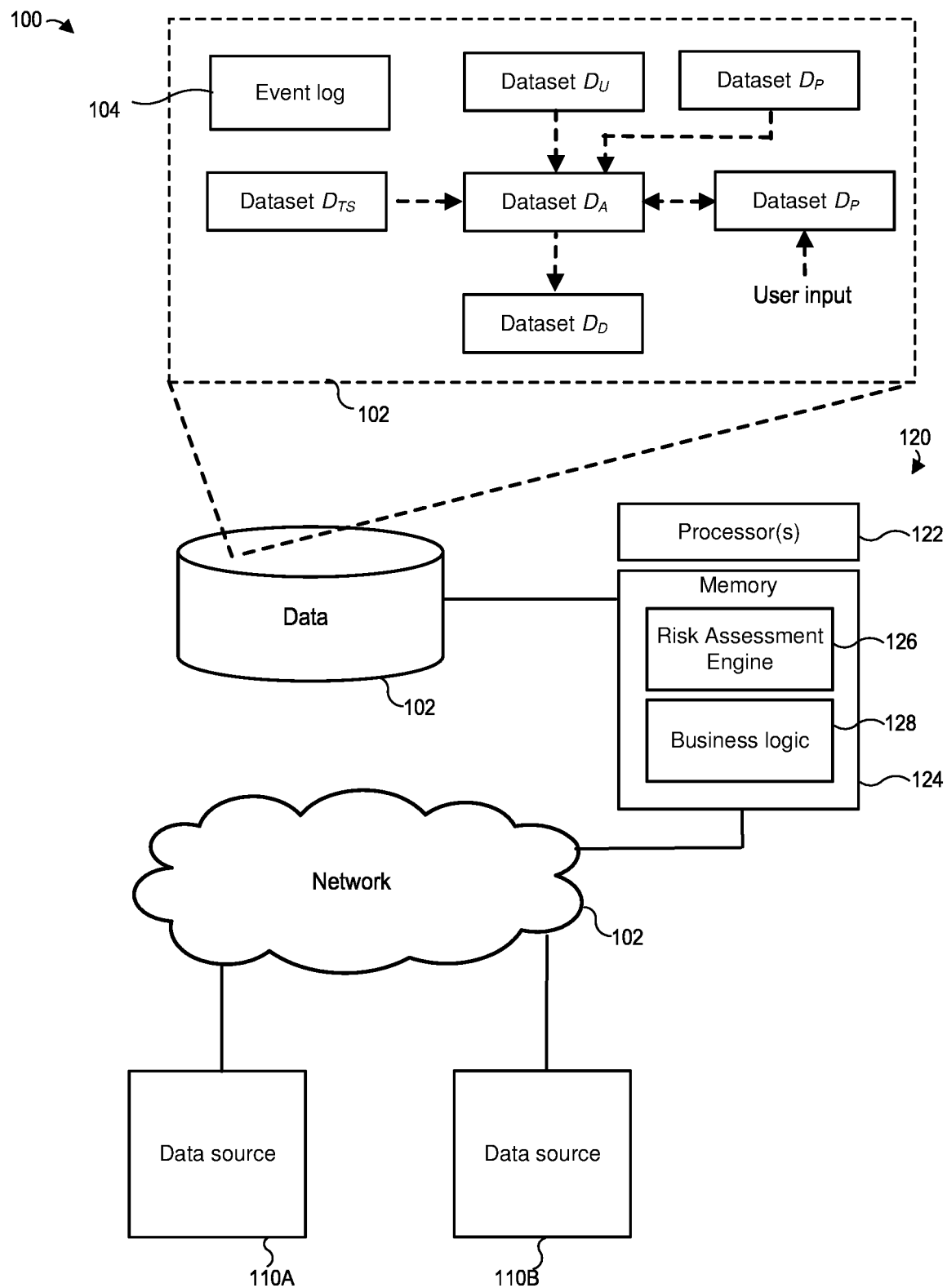
FIG. 1 is a block diagram of an example system in which the techniques of this disclosure for automatically determining dependencies between datasets can be implemented.

FIG. 1 illustrates a system 100 including a database 102 storing multiple datasets with certain mutual dependencies or, more generally, certain relationships. The database 102 also stores an event log 104 that indicates read and write operations related to the datasets in the database 102. The system 100 typically receives the datasets from multiple sources 110A, 110B, etc. One or more servers 120 perform various operations on the datasets such as for example merging, transformation, or creating dependent datasets. Each server 120 can include one or more processors 122 configured to execute software instructions stored in a memory 124, including a risk assessment engine 126 and business logic 128.

The system 100 can implement a secure control plane to provide an isolated secure execution environment for a data plane. The business logic 128, which can be any set of functions and procedures for analyzing batches of records associated with the datasets in the database 102, can execute within the data plane. The secure control plane can provide the necessary level of protecting privacy and data integrity.

For simplicity, the examples below relate primarily to datasets stored in the database 102. However, the risk assessment engine 126 in other scenarios or implementations can operate on metadata related to datasets stored in other systems. In other words, the system 100 need not control the database storing the datasets, and in general can determine the dependencies based on information such as, for example, a description of data structures, without accessing the actual data records. Other examples of information from which the risk assessment engine 126 can infer relationships between datasets include software instructions that make up the business logic 128 (e.g., a query related to dataset $D_1$, a read operation related to dataset $D_2$, or a write operation related to dataset $D_3$) as well as logs of operations the system 100 performs on datasets stored outside the database 102. The system 100 thus can assess the risk associated with datasets based on information that is merely descriptive of the datasets rather than the content of the datasets.

Generally speaking, a dataset stored in the database 102 can include any suitable number of records, each made up of multiple fields. In an example scenario, the system 100 receives a dataset $D_U$ from the data source 110A, which can be associated with a retailer. The dataset $D_U$ describes customer transactions during a certain period of time. Each record can include for example an identifier of a transaction and indications of the time when the transaction occurred, the type of the transaction, the amount of associated with the transaction, etc.

The risk assessment engine 126 in the example scenario generates a numeric metric of risk for a dataset $D_A$, which is downstream of the dataset $D_U$. The dataset $D_U$ accordingly is upstream relative to the dataset $D_A$. The system 100 performs certain operations on the dataset $D_U$ alone, or on the dataset $D_U$ in combination with one or more additional datasets, to generate the dataset $D_A$. For example, the system 100 can remove certain fields from the dataset $D_U$ that can be used for user identification to anonymize the dataset. As another example, the system 100 can also partially merge another dataset $D_P$ into the dataset $D_U$ to augment each record in the dataset $D_U$ with additional fields, or append at least some of the records in the dataset $D_P$ to the dataset $D_U$. The additional dataset in this case also operates as an upstream dataset relative to the dataset $D_A$, in a complete or partial type of dependency. As a more specific example, the additional dataset can indicate user interactions of a group of users with another online service, where the sets of users corresponding to these datasets and at least partially overlap. While FIG. 1 shows two separate datasets $D_P$, with only one showing user input, it is understood that these may be the same dataset, or that the depicted dataset $D_P$ with user input is a subset of the other depicted dataset $D_P$.

Further, the dataset $D_A$ can operate as an upstream dataset relative to a dataset $D_D$. The system 100 generates the dataset $D_P$ using the dataset $D_A$ and the dataset $D_P$. Further, the system 100 in this example uses a dataset $D_{TS}$ as a source of truth for certain operations on the dataset $D_A$. Thus, the dataset $D_A$ can be downstream relative to one or more datasets and upstream relative to one or more datasets.

Still further, datasets can define circular relationships. For example, the system 100 can use some of the data in the dataset $D_D$ to modify the dataset $D_U$. The database 102 in general can store any suitable number of datasets that have upstream and/or downstream relationships with one or multiple datasets. Upstream dependencies in general may be associated with providers of data, and downstream dependencies in general may be associated with consumers of data.

In some implementations, the risk assessment engine 126 generates an overall risk metric (e.g., an "expected impact" metric) for each dataset under consideration, based on both a "risk of corruption" (ROC) metric and an "impact of corruption" (IOC) metric for the dataset (e.g., with the overall metric being the product of the latter two metrics, with or without weighting). For the ROC metric, in some implementations, the risk assessment engine 126 may calculate a probability that the dataset contains corrupt data that is not mitigated by a particular recovery plan within a predetermined time or time frame. To this end, the risk assessment engine 126 may consider a set of upstream datasets, subject to one or more of the following limitations: (1) the set includes non-production datasets, but such datasets are not themselves analyzed; (2) non-trivial cycles that cannot be analyzed in a reasonable time frame are ignored; (3) production dataset that do not require a particular recovery plan are ignored; and/or (4) self-loops are ignored. In some implementations, the ROC metric is based at least in part on the probability of successful recovery, P(successful recovery), for the given dataset. For a group of N datasets (e.g., the given dataset and all its upstream datasets), the probability of successful recovery may be the product of the probability of successful recovery for each and every one of the N datasets.

In one example, the probability of success P(success) is computed as:

$$P(\text{success}) = \qquad\qquad\text{(Equation 1)}$$
$$P(\text{no corruption}) + [P(\text{corruption}) * P(\text{successful recovery})]$$

For a group of datasets, in one example, the probability of success P(group success) is computed as:

$$P(\text{group success}) = \qquad\qquad\text{(Equation 2)}$$
$$P(\text{success 1}) * P(\text{success 2}) * \ldots * P(\text{success } N)]$$

The probability for lack of success in Equation 1 and Equation 2 is 1-P, where P is either P(success) or P(group success).

In some implementations, the risk assessment engine 126 calculates a worst-case expected impact (e.g., by assuming all upstream datasets have no recovery plan), and then grades the dataset based on where actual risk lies between worst case and best case (zero expected impact).

For the IOC score of a given dataset, the risk assessment engine 126 generally examines the dataset's consumers (downstream dependencies). Various limitations may be applied by the risk assessment engine 126, such as one or more of the following: (1) non-production downstream datasets are ignored; (2) production non-critical downstream datasets are ignored; (3) non-trivial cycles that cannot be analyzed in a reasonable time frame are ignored; and/or (4) self-loops are ignored. In one implementation, the risk assessment engine 126 calculates the IOC score based on the number of downstream datasets. For example, the IOC score may equal the estimated or assumed dollar per hour impact multiplied by the number of downstream datasets. In some implementations, machine learning (ML) system datasets are weighted to have a higher IOC score by the risk assessment engine 126, due to the fact that ML systems may be more likely to hide corrupt data well. The risk assessment engine 126 may compute the IOC score of a group of datasets as the sum of the individual IOC scores for the constituent datasets.

In some implementations, the risk assessment engine 126 adds a count of distinct externally-facing systems (excluding non-critical systems) to the number of downstream datasets when calculating the IOC metric for a dataset, where the externally-facing system is a read-only system with respect to the dataset under consideration. The risk assessment engine 126 may consider downstream systems that are received from externally-facing systems, and cache the mapping of the system collection, for example.

In some implementations, the risk assessment engine 126 skews risk scores such that certain types of datasets (e.g., datasets comprising or consisting of data entered by users) have higher risk, and calculates the IOC metric by applying a higher weight to such datasets.

In some implementations, the server 120 (and/or a client device, etc.) generates and/or provides a report (e.g., display or user interface) that can help users prioritize which datasets to target to improve data reliability. For example, the risk assessment engine 126 may provide information that populates risk report page tabs, including grouped risk (e.g., a heat map that allows users to drill down to the riskiest datasets) and/or risk detail (e.g., visual indications of dataset-level risk metrics). In some implementations, the report may include the top N recommendations for where to most effectively apply data reliability efforts, and information indicating the reasoning behind each recommendation (e.g., indicating the source of risk and the impact). A user interface may also include a feedback mechanism for the user to express agreement or disagreement with each recommendation.

Some specific examples related to the above techniques are discussed below with reference to FIGS. 2 and 3.

Figure 2:
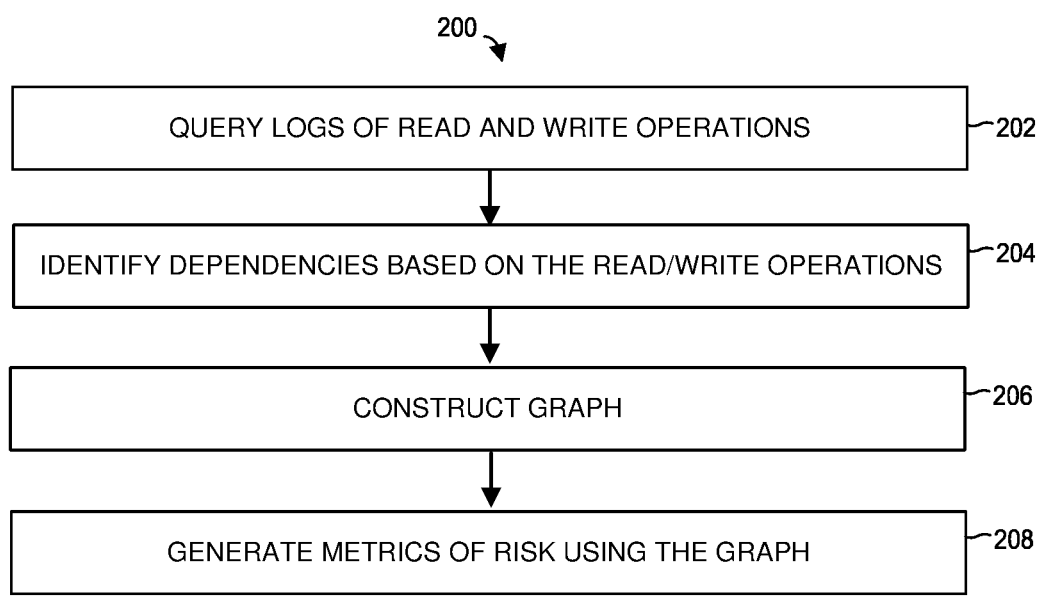
FIG. 2 is a flow diagram of an example method for discovering dependencies between datasets, which can be implemented in the system of FIG. 1.

Referring to FIG. 2, the risk assessment engine 126 can implement a method 200 to discover dependencies between datasets and generate a metric of risk for a certain dataset. In some scenarios, software developers may declare data sources using a predetermined format. As noted above, however, manually labeling the data sources can present problems with scaling and/or accuracy. Thus, in some implementations, dependency discovery is fully automated.

Accordingly, at block 202, the risk assessment engine 126 queries/processes logs of read and write operations. Next, at block 204, the risk assessment engine 126 determines dependencies between datasets based on the read and write operations. A read operation on a certain dataset $D_A$ and a corresponding write operation on a dataset $D_D$ indicates a dependency between the datasets $D_A$ and $D_D$. The event log 104 may store read and write operations or indications thereof.

The risk assessment engine 126 in some cases can infer data dependencies by first identifying corresponding systems. For example, the risk assessment engine 126 may identify systems associated with read and write operations rather than datasets associated with the read and write operations. For example, the system 100 can determine that the source 110A reads from the dataset $D_1$. If the source 110A is associated with dataset $D_2$, the system 100 can then infer a dependency of the dataset $D_2$ on the dataset $D_1$, i.e., that the dataset $D_2$ is downstream of the dataset $D_1$.

At block 206, the risk assessment engine 126 constructs a graph based on the determined dependencies. Depending on the implementation, the graph is a directed graph or an undirected graph. For example, the risk assessment engine 126 can associate a dependency with a directed edge originating at a node representing an upstream dataset and terminating at a node representing a downstream dataset (i.e., the edge "connects" or "interconnects" the two nodes/datasets). In another implementation, the risk assessment engine 126 associates an upstream or downstream relationship between a pair of nodes representing respective datasets with an undirected edge.

The risk assessment engine 126 in some implementations further assigns weights to the edges based on how the risk assessment engine 126 assesses the importance of the relationship between the datasets. For example, a dataset $D_1$ can be downstream of a dataset $D_2$ as well as a dataset $D_3$, but the dependency on the dataset $D_2$ may be more significant because of the type of the transformation required to derive the dataset $D_1$ from the dataset $D_2$. The risk assessment engine 126 accordingly assigns a larger weight to the edge between the nodes associated with the datasets $D_1$ and $D_2$ than the edge between the nodes associated with the datasets $D_1$ and $D_3$, in the dependency graph.

In another implementation, the risk assessment engine 126 assigns weights to nodes rather than edges in the dependency graph. For example, a dataset operating as an upstream dataset receives a larger weight than a dataset operating only as a downstream dataset. Additional factors the risk assessment engine 126 can consider when assigning weights to nodes and/or edges are discussed in more detail below with reference to FIG. 3.

At block 208, the risk assessment engine 126 generates/provides a metric of risk associated with a dataset. For example, the risk assessment engine 126 can assign a score to the dataset $D_A$ of FIG. 1 based on the following score components: upstream dependency relative to the dataset $D_D$ (generally a lower score component), downstream dependency relative to the datasets $D_U$ and $D_P$ (generally a lower score component), the size of the consumer base represented by the dataset $D_A$, a type of dependency (e.g., whether a dataset is a source of truth for another dataset), procedures in place to deal with data corruption, criticality of the dataset, etc. The risk assessment engine 126 can combine the score of components to generate a metric of risk assessment for the dataset $D_A$, for example.

Figure 3:
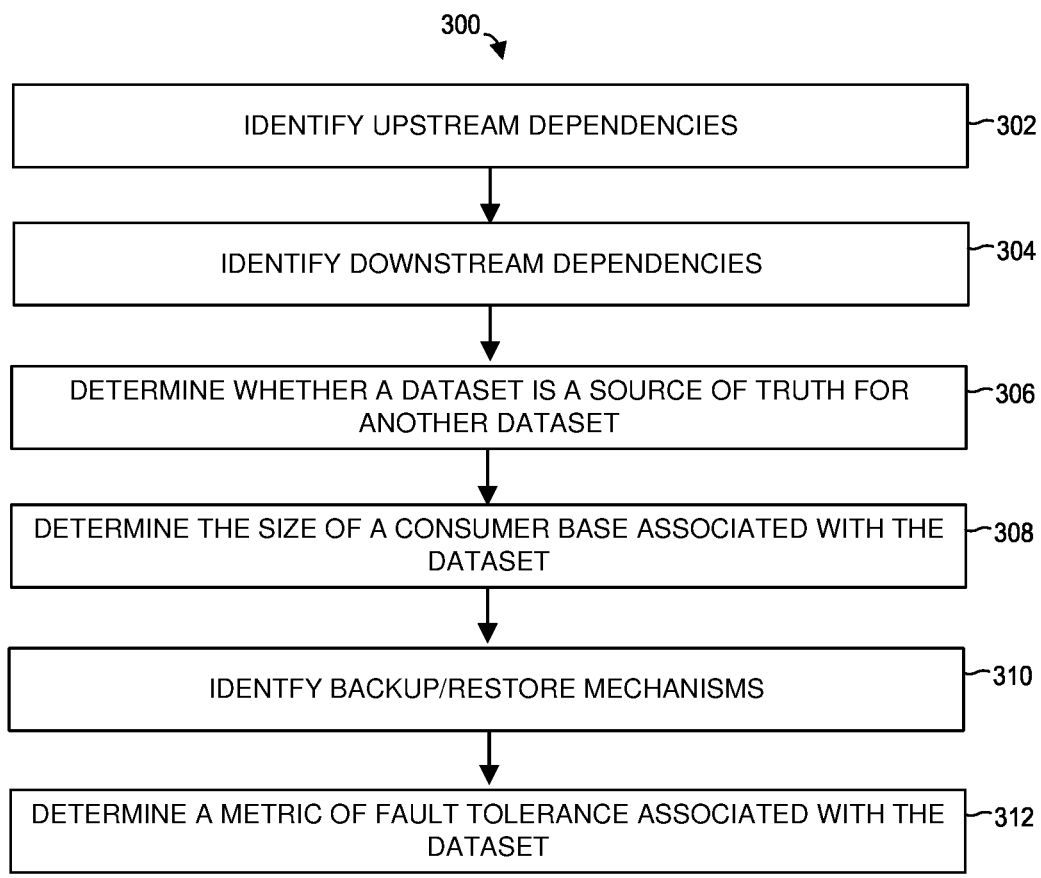
FIG. 3 is a flow diagram of an example method for generating a numeric metric indicative of a level of risk associated with a dataset, which can be implemented in the system of FIG. 1.

Now referring to FIG. 3, the risk assessment engine 126 can implement a method 300 to generate a numeric metric indicative of a level of risk associated with a particular dataset.

At block 302, the risk assessment engine 126 identifies upstream dependencies for the dataset. At block 304, the risk assessment engine 126 identifies downstream dependencies for the dataset. The risk assessment engine 126 can identify upstream and downstream dependencies using operation logs (e.g., read and write logs), software instructions in the business logic that reference the datasets, explicit indications of dependencies received from the data sources, etc.

At block 306, the risk assessment engine 126 determines whether the dataset is a source of truth for another dataset. A dataset that operates as a source of truth for another dataset generally is associated with a higher level of risk than a dataset which the system 100 generates. For example, the system 100 may be able to re-generate the dataset $D_A$ using the datasets $D_U$ and $D_P$ or the dataset $D_P$ using the dataset $D_A$, if necessary, but the system 100 may not be able to regenerate the dataset $D_{TS}$. Further, the risk assessment engine 126 can apply this principle to systems associated with datasets, such as the data source 110A or 110B.

At block 308, the risk assessment engine 126 determines the size of a consumer base associated with the dataset. For example, if one dataset pertains to 1,000 consumers whereas another dataset pertains to only 10 consumers, the risk assessment engine 126 can assign a higher score to the dataset with the larger customer base.

At block 310, the risk assessment engine 126 determines whether backup or restore mechanisms (and/or other protective procedures) are in place for the dataset. For example, there may be a backup schedule for a certain dataset, lowering the risk associated with the dataset. The risk assessment engine 126 can further analyze configuration records that specify the backup and restore policies for a dataset.

At block 312, the risk assessment engine 126 determines the extent to which the dataset is fault-tolerant. For example, the risk assessment engine 126 can determine, based on the software instructions in the business logic or explicit indication receives from the corresponding source for example, that a dataset $D_1$ can tolerate a certain percentage of faulty data records for 24 hours, whereas a dataset $D_2$ can tolerate a certain percentage of faulty data records for 1 hour, and a dataset $D_3$ can tolerate no faulty data records at any time. Accordingly, the risk assessment engine 126 assigns a lower component of the risk score to the dataset $D_1$, a higher component to the dataset $D_2$, and an even higher component to the dataset $D_3$.

The following description may be applied to the description above.

Certain embodiments are described in this disclosure as including logic or a number of components or modules. Modules may be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for the techniques disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method of risk assessment for a target dataset including a plurality of records, the method implemented in a computing system and comprising:
   receiving, by one or more processors and from a data source, information related to a plurality of datasets including the target dataset;
   automatically determining, by the one or more processors, dependencies on the target dataset using logs indicative of read and write operations related to the target dataset;
   generating, by the one or more processors and using the determined dependencies, a dependency graph indicative of the read and write operations, within the plurality of datasets, on the target dataset, wherein each operation of the read and write operations represents an edge within the dependency graph;
   determining, by the one or more processors and using the generated dependency graph, a level of risk associated with the target dataset, wherein the level of risk is based on a risk of corruption (ROC) and an impact of corruption (IOC) for the target dataset; and
   providing, by the one or more processors, an indication of the determined level of risk.

2. The method of claim 1, wherein:
   the dependency graph is a directed graph; and
   each edge in the dependency graph connecting a first node to a second node indicates dependency of a dataset associated with the second node on a dataset associated with the first node.

3. The method of claim 1, wherein automatically determining the dependencies includes:
   increasing a weight of an edge in the dependency graph when the edge is directed from an upstream dataset to a downstream dataset.

4. The method of claim 1, wherein:
   the dependency graph is an undirected graph; and
   each edge in the dependency graph interconnecting a first node and a second node indicates a dependency between the first node and the second node.

5. The method of claim 1, wherein automatically determining the dependencies includes:
   assigning a weight to an edge in the dependency graph based on a relationship between datasets associated with respective nodes connected by the edge.

6. The method of claim 1, wherein automatically determining the dependencies includes:
   assigning a weight to a node in the dependency graph based on whether a dataset represented by the node is upstream of another dataset.

7. The method of claim 1, wherein automatically determining the dependencies includes:
   assigning a weight to a node in the dependency graph based on whether a dataset represented by the node is downstream of another dataset.

8. The method of claim 1, wherein automatically determining the dependencies includes:
   assigning a weight to a node in the dependency graph based on a size of a customer base associated with a dataset represented by the node.

9. The method of claim 1, wherein automatically determining the dependencies includes:
   assigning a weight to a node in the dependency graph based on whether a dataset represented by the node is associated with a backup or restore mechanism.

10. The method of claim 1, wherein automatically determining the dependencies includes:
    assigning a weight to a node in the dependency graph based on a metric of fault tolerance associated with a dataset represented by the node.

11. A computing system comprising:
    one or more processors; and
    a non-transitory computer-readable medium storing thereon instructions that, when executed by the one or more processors, implement a method of risk assessment for a target dataset including a plurality of records, the method comprising:
      receiving, from a data source, information related to a plurality of datasets including the target dataset;
      automatically determining dependencies on the target dataset using logs indicative of read and write operations related to the target dataset;
      generating, using the determined dependencies, a dependency graph indicative of the read and write operations, within the plurality of datasets, on the target dataset, wherein each operation of the read and write operations represents an edge within the dependency graph;

determining, using the generated dependency graph, a level of risk associated with the target dataset, wherein the level of risk is based on a risk of corruption (ROC) and an impact of corruption (IOC) for the target dataset; and providing an indication of the determined level of risk.

12. The computing system of claim 11, wherein:

the dependency graph is a directed graph; and each edge in the dependency graph connecting a first node to a second node indicates dependency of a dataset associated with the second node on a dataset associated with the first node.

13. The computing system of claim 11, wherein automatically determining the dependencies includes:

increasing a weight of an edge in the dependency graph when the edge is directed from an upstream dataset to a downstream dataset.

14. The computing system of claim 11, wherein:

the dependency graph is an undirected graph; and each edge in the dependency graph interconnecting a first node and a second node indicates a dependency between the first node and the second node.

15. The computing system of claim 11, wherein automatically determining the dependencies includes:

assigning a weight to an edge in the dependency graph based on a relationship between datasets associated with respective nodes connected by the edge.

16. The computing system of claim 11, wherein automatically determining the dependencies includes:

assigning a weight to a node in the dependency graph based on whether a dataset represented by the node is upstream of another dataset.

17. The computing system of claim 11, wherein automatically determining the dependencies includes:

assigning a weight to a node in the dependency graph based on whether a dataset represented by the node is downstream of another dataset.

18. The computing system of claim 11, wherein automatically determining the dependencies includes:

assigning a weight to a node in the dependency graph based on a size of a customer base associated with a dataset represented by the node.

19. The computing system of claim 11, wherein automatically determining the dependencies includes:

assigning a weight to a node in the dependency graph based on whether a dataset represented by the node is associated with a backup or restore mechanism.

20. The computing system of claim 11, wherein automatically determining the dependencies includes:

assigning a weight to a node in the dependency graph based on a metric of fault tolerance associated with a dataset represented by the node.

\* \* \* \* \*